June 6, 1933.  C. A. LINDBLOM  1,913,166

FLOATING BACK PLATE BRAKE MECHANISM

Filed Aug. 17, 1931

Inventor
Carl A. Lindblom

By Blackmore, Spencer & Flint
Attorneys

Patented June 6, 1933

1,913,166

UNITED STATES PATENT OFFICE

CARL A. LINDBLOM, OF DETROIT, MICHIGAN, ASSIGNOR TO GENERAL MOTORS CORPORATION, OF DETROIT, MICHIGAN, A CORPORATION OF DELAWARE

FLOATING BACK PLATE BRAKE MECHANISM

Application filed August 17, 1931. Serial No. 557,561.

This invention relates to brakes, particularly to brakes used for retarding the rotation of vehicle wheels.

An object of the invention is to provide a floating operating mechanism of simple form which shall accommodate self-actuation of the shoes and unequal lining wear.

Other objects and advantages will be understood from the following description.

In the accompanying drawing—

Figure 3:
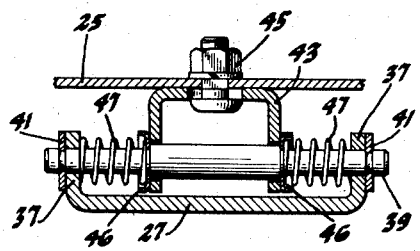
Fig. 3 is a transverse section on line 3—3 of Fig. 2.
Figure 4:
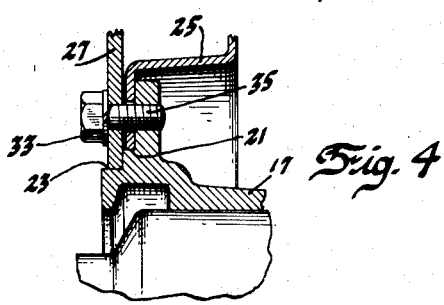
Fig. 4 is a section on line 4—4 of Fig. 2.

Referring by reference characters to the drawing, numeral 7 is a wheel hub having spokes 9 and a brake drum 11. At 13 is an axle housing for an axle 15. A flange 17 is secured to the axle housing by fastening means 19. The flange 17 has two shoulders 21 and 23. The shoulder 21 seats the cover plate 25 and the shoulder 23 seats an anchor plate 27. As will be seen from Fig. 1, the anchor plate 27 is located midway across the brake drum and carries a pin 29 extending from both sides of the plate. Upon this pin the two shoes 31 and 31 are mounted to rotate. A plurality of bolts 33 secure the anchor plate 27 to the axle flange 17. These same bolts pass through elongated circumferential slots 35 in the cover plate 25. As a result the cover plate 25 is not immovably secured to the axle flange as is usual, but has a limited circumferential movement relative to the axle and the brake anchor plate. The anchor plate, at its upper end, has inturned ears 37, and a pin 39 extends between the ears and is held from axial movement by suitable retainers 41. A U-shaped clip 43 is secured by fastening means 45 to the cover plate, its arms extending between the ears 37 as shown in Fig. 3. For the purpose of adjustment it will also be observed that the clip 43 is provided with an elongated opening for the passage of the fastening means 45. Stamped cups 46 are placed on the outer sides of the arms of the clip 43, and springs 47 are located between these cups and the ears 37.

Adjacent the means for spreading the shoes into contact with the drum, there is provided a spring 49 connecting the shoes and holding them in their released position.

Figure 1:
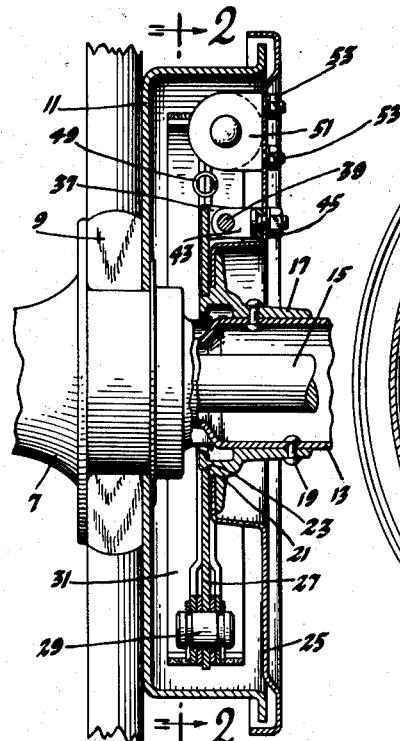
Fig. 1 is a vertical section through the brake.
Figure 2:
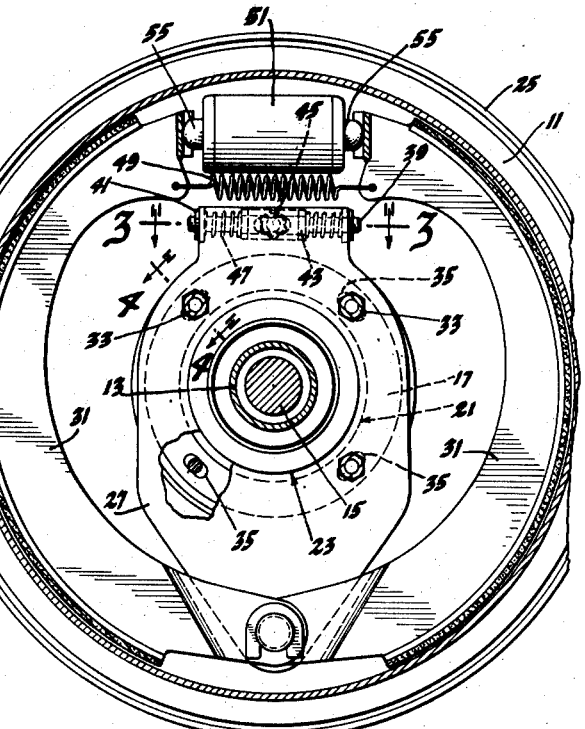
Fig. 2 is a section as seen from line 2—2 of Fig. 1.

Figs. 1 and 2 illustrate one operating mechanism for expanding the shoes. A preferably tubular member 51 of an hydraulic brake system is secured to the cover member 25 by fastening means 53. It has projecting plungers 55 which are projected by the incoming fluid medium to expand the shoes 31 against the drum.

Figure 5:
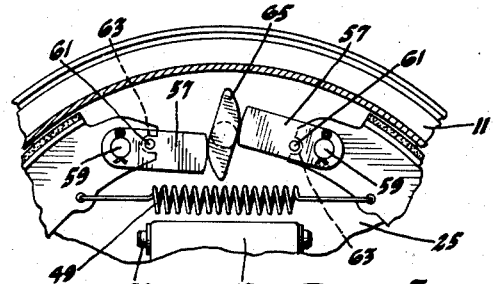
Fig. 5 is a view corresponding to Fig. 2 but showing a modified form.

Fig. 5 shows a second arrangement for expanding the shoes. In this form there are roller sectors 57 pivoted to the shoes at 59 and limited rotary movement is provided about these pivots by pins 61 and slots 63. A cam 65 is rotatably journaled in the cover plate 25, this cam being in engagement with the roller sectors.

With both arrangements the shoes are expanded by means carried by and movable with the rotatable cover plate. The cover plate is normally held in its neutral position by the expedient shown in Fig. 3. If in applying the brake, one or the other of the shoes is rotated by the drum as well as by the manually applied force, the cover plate carrying the actuating means moves bodily with the result that the manual effort is equally divided between the two shoes. This is a well known and desirable arrangement. Heretofore this operation has been accomplished by more or less cumbersome expedients in the nature of attachments movably carried by the cover plate. By my expedient of movably mounting the cover plate itself for resiliently restrained limited movement, I am able to obtain the results heretofore obtained in a very simple manner.

My arrangement also permits journaling the camshaft in the cover plate. To accommodate unequal lining wear and to secure a normal position of adjustment, the brake may be applied with the vehicle at rest and with the fastening means 45 released. Under such circumstances the tension of the two springs 47 will be equal and the fastening means may be secured. Upon the release of the brake-applying means, the clearance of the two opposed shoes will be equal.

I claim:

1. In combination, a brake drum, a plate, means to mount said plate for resiliently restrained limited rotary movement, brake means within the drum, anchoring means for said brake means independent of said plate, and means carried by said plate to expand said brake means into contact with the drum.

2. In combination, a brake drum, brake means to engage the drum, a relatively fixed anchor for said brake means, a plate, means to mount said plate with a resiliently restrained limited rotary movement relative to said anchor, and means carried by said plate for bringing said brake means into frictional contact with said drum.

3. The invention defined by claim 2, said means for mounting said plate comprising opposed members carried by said anchor and plate and yielding means between said opposed members to resist movement of the plate relatively to the anchor and to restore said parts to their predetermined normal position.

4. In a brake, a drum, brake means within the drum, relatively fixed anchor means for said brake means, a cover plate mounted for rotation, brake-actuating means carried by the cover plate, resilient means to restore the cover plate to a predetermined normal position and to yield to permit equalized action upon the self-actuating and non-self-actuating shoes.

5. The invention defined by claim 4, said actuating means comprising a cam and a camshaft, said camshaft being rotatably journaled in said cover plate.

6. The invention defined by claim 4, said actuating means comprising an hydraulic brake-applying mechanism carried fixedly by said cover plate.

In testimony whereof I affix my signature.

CARL A. LINDBLOM.